United States Patent
Lindoff et al.

(10) Patent No.: US 7,986,758 B2
(45) Date of Patent: Jul. 26, 2011

(54) SYNCHRONIZATION DETECTION USING BANDWIDTH AND ANTENNA CONFIGURATION

(75) Inventors: Bengt Lindoff, Bjärred (SE); Muhammad Ali Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 540 days.

(21) Appl. No.: 12/187,553

(22) Filed: Aug. 7, 2008

(65) Prior Publication Data
US 2009/0296864 A1    Dec. 3, 2009

Related U.S. Application Data

(60) Provisional application No. 61/057,709, filed on May 30, 2008.

(51) Int. Cl.
*H04L 7/00* (2006.01)
(52) U.S. Cl. ......... 375/357; 375/354; 375/356; 370/350
(58) Field of Classification Search .................. 375/357, 375/354, 356; 370/350
See application file for complete search history.

(56) References Cited

U.S. PATENT DOCUMENTS

| 5,574,979 | A | * | 11/1996 | West | 455/63.1 |
| 5,955,959 | A | * | 9/1999 | Taki et al. | 340/3.2 |
| 6,002,722 | A | * | 12/1999 | Wu | 375/295 |
| 7,149,538 | B2 | | 12/2006 | Lindoff et al. | |

FOREIGN PATENT DOCUMENTS

| WO | 0163794 A2 | 8/2001 |
| WO | 2006084907 A1 | 8/2006 |

OTHER PUBLICATIONS

"3GPP TS 25.214 v8.1.0 (Mar. 2008)." 3rd Generation Partnership Project; Technical Specification Group Radio Access Network; Physical layer procedures (FDD) (Release 8). 87 pages. © 2008, 3GPP Organizational Partners. 3GPP, Valbonne, France.
"Universal Mobile Telecommunications Systems (UMTS); UE Radio Transmission and Reception (FDD)" 3GPP TS 25.101 version 4.0.0 Release 4. ETSI TS 125 101 v4.0.0. Apr. 23, 2001. pp. 1-68. ETSI, Sophia Antipolis, France.
"International Search Report," application No. PCT/EP2009/055835. Date of mailing: Aug. 19, 2009. European Patent Office, Rijswijk, Netherlands.

* cited by examiner

*Primary Examiner* — Ted M Wang
(74) *Attorney, Agent, or Firm* — Coats & Bennett, PLLC

(57) ABSTRACT

User Equipment in a wireless communication network considers the downlink channel bandwidth in setting out of synchronization (OoS) and in synchronization (IS) thresholds and filter durations. Additionally, the UE may consider transmitter antenna configuration—that is, the number of transmitting antennas in a MIMO system—in setting the OoS and IS thresholds. The UE determines it is OoS when a monitored, filtered, downlink channel quality metric, such as reference symbol SINR, is below the OoS threshold.

17 Claims, 2 Drawing Sheets

SYNCHRONIZATION DETECTION USING BANDWIDTH AND ANTENNA CONFIGURATION

This application claims priority to U.S. provisional patent application Ser. No. 61/057,709, entitled "Out-of-sync/in-sync detection in variable bandwidth scenario in LTE" filed May 30, 2008, and incorporated herein by reference in its entirety.

FIELD OF THE INVENTION

The present invention relates generally to wireless communication networks, and in particular to a method of utilizing downlink channel bandwidth and transmitter antenna configuration information in detecting whether User Equipment is out of synchronization with the network.

BACKGROUND

In cellular wireless communication systems, mobile terminals (referred to herein as User Equipment or UE) receive signals transmitted on downlink channels by network transmitters (base stations, or Node B). The UE continuously monitor the channel quality in order to connect to the Node B transmitting the best signal. If the channel quality, as determined by a metric such as the Signal to Interference and Noise Ratio (SINR) goes below a threshold value, the UE typically have problems detecting and reading control and data channels. This in turns means that the UE could miss important information, and/or could misinterpret control signals. For example, a UE erroneously interpreting a control signal may transmit information on a time/frequency/code position reserved for another UE. Thus, UEs out of a coverage area, or cell, of the network could create unnecessary interference. In this case, the UE is said to be out of synchronization with the network.

Prior art Out of Synchronization (OoS) detectors are based on monitoring predetermined control signaling for a particular channel quality metric, such as SINR. Over a predetermined duration T, if the average SINR is below a threshold corresponding to an excessive Block Error Rate (BLER) on control channels (e.g., 10-30% or greater), the UE is deemed to be OoS. The duration T should be chosen such that instantaneous fading dips should not trigger an OoS detection, implying T in the range of 100 ms in currently defined cellular systems.

A formal OoS condition was introduced in Wideband CDMA (WCDMA). The UE monitors the Downlink Dedicated Physical Channel (DL-DPCH) SINR. When the DL-DPCH SINR is too low for reliable control decoding, the UE must cease transmission on the uplink, in order not to interfere with other UEs. Furthermore, due to persistent poor downlink SINR, the UE will transmit power up command resulting in saturation of base station transmit power. One example of such an OoS detection procedure is described in U.S. Pat. No. 7,149,538.

Once a UE is determined to be OoS, it is important that the UE continues to monitor downlink channel quality, so that it may regain synchronization with the network upon receiving a signal of sufficient quality to detect the downlink control signaling. Accurate In Synchronization (IS) detection is important following connection setup or handoff, as well as following OoS detection.

Prior art OoS and IS detection methods do not consider the bandwidth of downlink channels, or transmitter antenna configurations. Advanced wireless communication networks, such as those conforming to the UTRAN LTE (UMTS Terrestrial Radio Access Network Long Term Evolution) protocol, may be configured to operate with a plurality of different defined bandwidths in the downlink. Additionally, LTE supports MIMO (Multiple Input, Multiple Output) techniques employing multiple transmit antennas. Both the bandwidth utilized and the transmit antenna configuration profoundly affect downlink control channel decoding performance.

SUMMARY

According to one or more embodiments disclosed herein, a UE in a wireless communication network considers the downlink channel bandwidth in setting out of synchronization (OoS) and in synchronization (IS) thresholds and filter durations. Additionally, the UE may consider transmitter antenna configuration—that is, the number of transmitting antennas in a MIMO system—in setting the OoS and IS thresholds.

One embodiment relates to a method of determining synchronization of a UE in a wireless communication network. The bandwidth (BW) of downlink communication channels to the UE is determined, and an OoS threshold is set based on the downlink BW. At least one metric of downlink communication channel quality is monitored and compared to the OoS threshold. If the channel quality metric is below the OoS threshold, it is determined that the UE is out of synchronization with the network.

Another embodiment relates to a UE operative in a wireless communication network. The UE includes a receiver and a controller. The controller is operative to control the receiver, and further operative to determine the BW of downlink communication channels to the UE; set an OoS threshold based on the downlink BW; monitor at least one metric of downlink communication channel quality; compare the channel quality metric to the OoS threshold; and if the channel quality metric is below the OoS threshold, determine that the UE is out of synchronization with the network.

DETAILED DESCRIPTION

Figure 1:
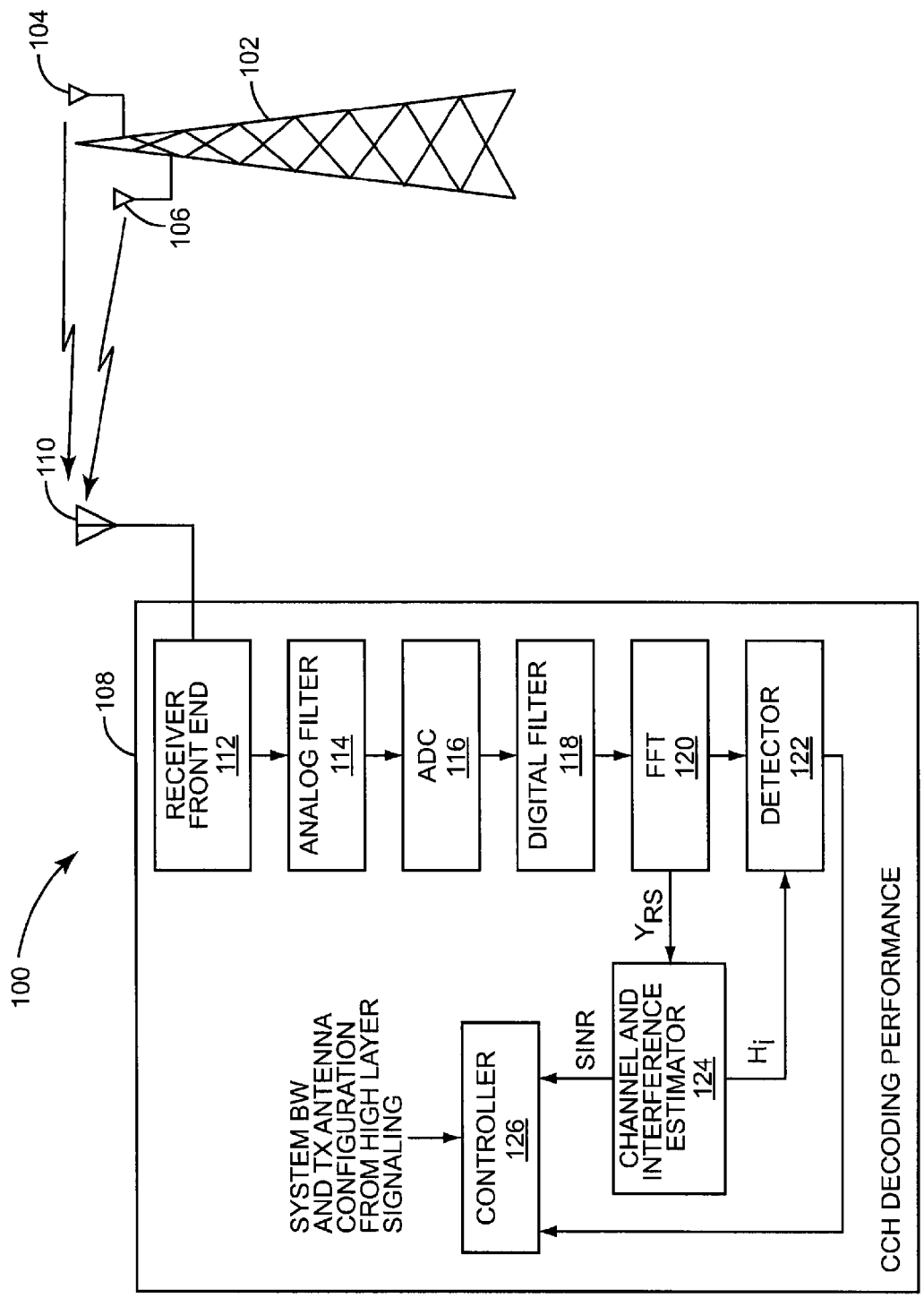
FIG. 1 is a functional block diagram of part of a wireless communication network.

FIG. 1 depicts a portion of a wireless communication network 100, including a transmitter 102 and a mobile terminal, or User Equipment (UE) 108. The network 100 may, for example, comprise a UTRAN LTE network, or any other wireless communication system protocol known in the art or to be developed in the future. The LTE system utilizes variable-bandwidth OFDM (Orthogonal Frequency Division Multiplexing), and supports both SIMO and MIMO (Single/Multiple Input, Multiple Output) antenna configurations.

A wireless network transmitter 102, referred to as Node B in UMTS, transmits signals in a downlink direction (from the Node B 102 to UE 108) from a plurality of antennae 104, 106 in the MIMO implementation depicted in FIG. 1. The multiple antennae 104, 106 are used to enhance bandwidth efficiency. MIMO systems provide multiple inputs and multiple outputs for a single channel and are thus able to exploit spatial diversity and spatial multiplexing. Different MIMO transmission modes in the downlink direction utilize channel information to implement link adaptation. The UE 108 monitors the downlink channel quality, and feeds back channel state information to the Node B 102, which may then perform appropriate space-time processing such as multi-user scheduling, power and modulation adaptation, beamforming, and space-time coding. The LTE protocol supports a plurality of downlink cell transmission bandwidths also refers to system bandwidth, such as 1.4, 3, 5, 10, 15, and 20 MHz. The common channels such as primary BCH (P-BCH) and synchronization channels are transmitted over limited portion of cell bandwidth (over central 6 resource blocks) regardless of cell bandwidth. However, shared channels and associated control channels could be sent over the entire cell bandwidth. Here the determination of downlink bandwidth means the downlink bandwidth of the entire cell.

The UE 108 receives downlink transmissions at one or more antennae 110. Received signals are amplified and processed in a front end receiver circuit 112, filtered by an analog filter 114, and converted to digital format by an ADC 116. The digital signal is then further filtered by a digital filter 118 and presented to a Fast Fourier Transform (FFT) function 120 that determines the frequency domain samples of the received signals. The sub-carriers corresponding to reference (pilot) symbols are fed to the channel estimation function 124, which estimates the channel coefficients as well as the interference and reference symbol SINR. The channel estimates are provided to a detector 122, that decodes the data and control channel information. The instantaneous SINR is provided to a controller 126. Information regarding control channel decoding performance, such as for example PCFICH soft values, may also presented to the controller 126. The controller 126 also receives information on the system bandwidth and transmitter antenna configuration, for example, from higher layer signaling. This information (bandwidth and antenna configuration in a cell) is sent on broadcast channel for UE in idle mode. A connected mode UE prior to handover acquires target cell's bandwidth and antenna configuration from the serving (old cell) in a handover command.

The controller 126 determines OoS (or IS in case UE is OoS) status based on the reference symbol SINR (or other channel quality metric), system BW, and optionally the transmitter antenna configuration. The controller 126 then takes further action based on the determined IS and OoS states, such as ceasing transmission of some or all signals in a transmitter circuit (not shown). The controller 126 may comprise a general-purpose, stored-program microprocessor, a digital signal processor (DSP), programmable logic, a dedicated full-custom controller, or any combination of hardware, software, and firmware known in the art. Additionally, the digital filter 118, FFT 120, detector 122, and channel estimator 124 functions may comprise software routines executed on one or more processors and/or DSPs, or may be implemented as any combination of hardware, software, and firmware known in the art.

As noted above, the bandwidth utilized in downlink channels, and the transmit antenna configuration (e.g., whether one, two, or more antennae 104, 106 are used to transmit signals from the Node B 102), profoundly affect downlink control channel decoding performance. According to one or more embodiments of the present invention described herein, these channel characteristics are determined by the UE 108, and considered in setting thresholds for OoS and IS detection. Since the downlink BW also has an impact on the length of fading dips, the time constant in OoS and IS filters may also be adapted based on the system BW.

Figure 2:
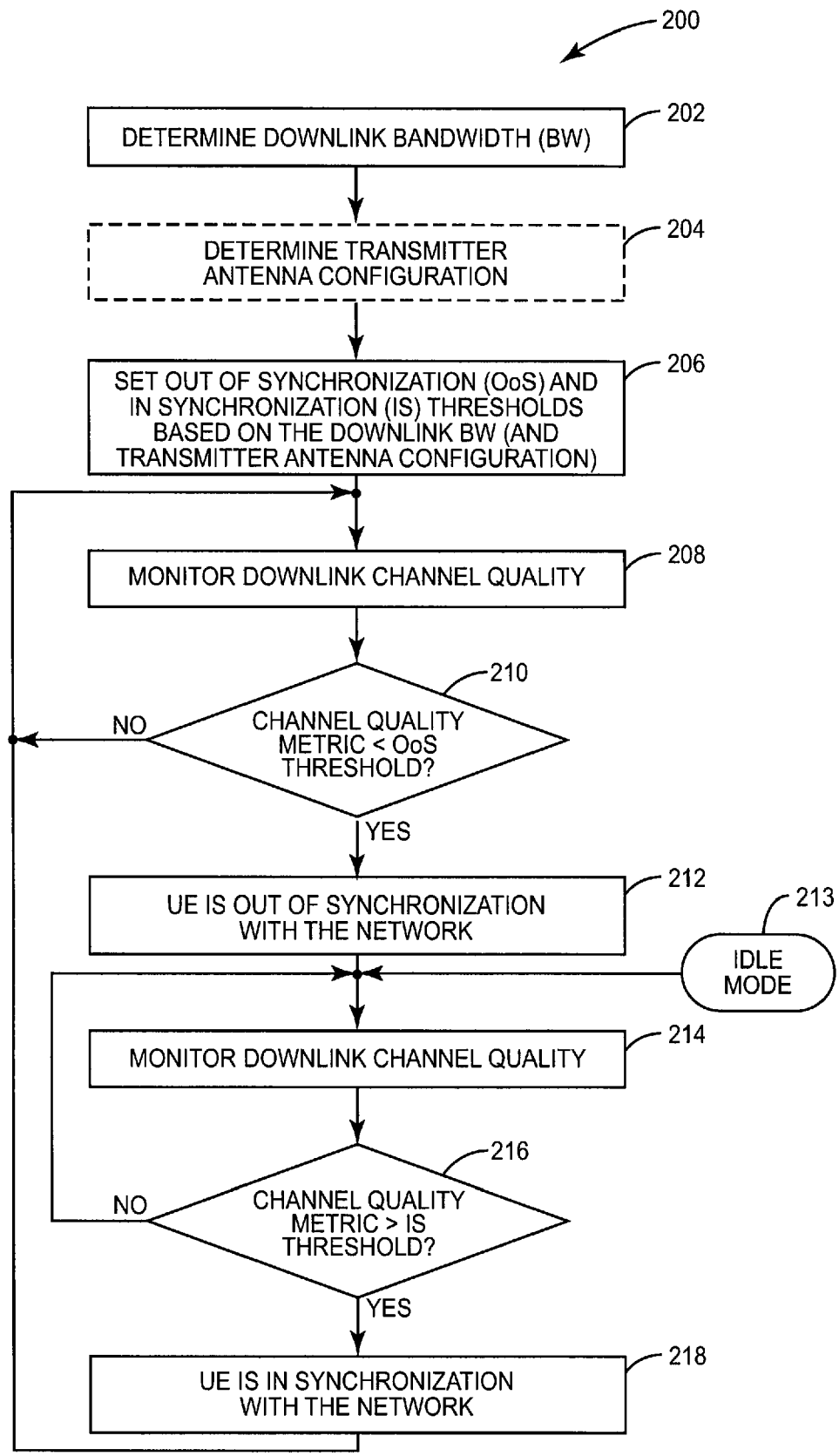
FIG. 2 is a flow diagram of a method of determining that User Equipment (UE) is out of synchronization with a wireless communication network.

A method 200 of OoS and IS detection is depicted in FIG. 2. The UE 108 determines the bandwidth of the downlink channel (step 202). This determination may be achieved via higher layer signaling messages, or determined from broadcast information on one or more control channels. The UE 108 also optionally determines the transmitter antenna configuration at the Node B 102 (step 204). This determination may also be achieved via higher layer signaling messages, or by explicit detection, such as reading and determining the Primary Broadcast signal in LTE, which is scrambled with a transmitter antenna-specific scrambling code. The UE 108 sets the OoS and IS thresholds and filter values based on the downlink BW and optionally also the transmitter antenna configuration (step 206).

For larger downlink channel bandwidth values, such as for example those greater than 5 MHz, control channel decoding may become unreliable at a reference symbol SINR (per antenna) of approximately −4 to −5 dB. In contrast, for lower downlink channel bandwidth values, such as for example 1.4-3 MHz, the corresponding SINR threshold values are approximately −2 to −3 dB. The IS threshold may be the same as the OoS threshold. Alternatively, the IS thresholds may be different than the OoS threshold. For example, the IS threshold for the larger bandwidth may be approximately −2 to —3 dB SINR, and 0 to −1 dB for the lower bandwidth values.

The OoS filter duration—or the length over which the SNIR is averaged to mitigate the effects of fast fading—may be in the range of 100-200 ms for the larger bandwidths, and in the range of 300-400 ms for these smaller bandwidth values. The IS filter duration may be the same, or may be shorter, such as approximately 20-40% of the OoS filter duration. In discontinuous reception (DRX) mode the filter length will be longer than the values mentioned above; typically it is proportional to the DRX cycle length.

The UE 108 monitors the downlink channel quality (step 208), such as by monitoring the SINR of downlink reference symbols, the BLER of a control channel, or the like. If the measured downlink channel quality metric—filtered, or averaged over a duration determined in response to the downlink BW and/or transmitter antenna configuration—is below the OoS threshold (step 210), then the UE 108 determines that it is out of synchronization with the wireless communication network 100 (step 212). The UE 108 may take several actions at this point. For example, in one embodiment the UE 108 may cease transmitting Channel Quality Indicators (CQI) on the uplink. This may be an indication to the network that OoS has occurred. In another embodiment, the UE 108 may terminate all uplink transmissions, such as by disabling the transmitter side of its transceiver. In another embodiment, the UE 108 may initiate a connection release timer at upper protocol layers.

Regardless of the measures taken upon detecting that the UE 108 is out of synchronization with the network 100, the UE 108 continues to search for a downlink signal and to monitor the downlink channel quality (step 214). When the measured downlink channel quality metric—again, filtered over a duration that may be determined in response to the downlink cell BW and/or transmitter antenna configuration (and may differ from the OoS filter duration)—is above the IS threshold (step 216), then the UE 108 determines that it is again in synchronization with the wireless communication network 100 (step 218). The UE 108 may then enable its transmitter, resume transmitting CQI, disable a connection release timer, and/or take other action to allow it to communicate effectively with the wireless communication network 100. The UE 108 continues to monitor the downlink channel quality (step 208) to detect if it again goes OoS (step 210).

Table 1 below presents a set of exemplary OoS thresholds and filter lengths as a function of downlink cell bandwidth and transmitter antenna configuration.

TABLE 1

OoS Thresholds and Filter Lengths

| Cell BW (MHz) | Filter Length (ms) | OoS Detection Threshold: Ref. Symbol SINR (dB) | | |
|---|---|---|---|---|
| | | 1 TX antenna | 2 TX antenna | 3 TX antenna |
| 1.4 | 400 | −3 | −4 | −5 |
| 3 | 400 | −4 | −5 | −6 |
| 5 | 200 | −5 | −6 | −6 |
| 10 | 200 | −5 | −6 | −6 |
| 15 | 200 | −5 | −6 | −6 |
| 20 | 200 | −5 | −6 | −6 |

Table 2 below presents a set of exemplary IS thresholds and filter lengths as a function of downlink cell bandwidth and transmitter antenna configuration.

TABLE 2

IS Thresholds and Filter Lengths

| Cell BW (MHz) | Filter Length (ms) | IS Detection Threshold: Ref. Symbol SINR (dB) | | |
|---|---|---|---|---|
| | | 1 TX antenna | 2 TX antenna | 3 TX antenna |
| 1.4 | 300 | 0 | −1 | −2 |
| 3 | 300 | −1 | −2 | −3 |
| 5 | 100 | −2 | −3 | −3 |
| 10 | 100 | −2 | −3 | −3 |
| 15 | 100 | −2 | −3 | −3 |
| 20 | 100 | −2 | −3 | −3 |

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of determining synchronization of a User Equipment (UE) in a wireless communication network, comprising:
    determining a downlink cell transmission bandwidth (BW);
    setting an Out of Synchronization (OoS) threshold based on the downlink BW;
    monitoring at least one metric of downlink communication channel quality;
    comparing the channel quality metric to the OoS threshold; and
    if the channel quality metric is below the OoS threshold, determining that the UE is out of synchronization with the network.

2. The method of claim 1 wherein monitoring at least one metric of downlink communication channel quality comprises averaging the value of the channel quality metric over a duration determined in response to the downlink BW.

3. The method of claim 1 further comprising determining an antenna configuration at a wireless communication network transmitter, and wherein setting an OoS threshold based on the downlink BW comprises setting an OoS threshold based on the downlink BW and the transmitter antenna configuration.

4. The method of claim 1 further comprising, after determining the UE is OoS:
    monitoring at least one metric of downlink communication channel quality; and
    if the channel quality metric exceeds an In Synchronization (IS) threshold, determining that the UE is in synchronization with the network.

5. The method of claim 4 wherein the IS threshold is the same as the OoS threshold.

6. The method of claim 4 wherein the IS threshold is different than the OoS threshold.

7. The method of claim 6 wherein the IS threshold is less than the OoS threshold.

8. The method of claim 6 wherein the IS threshold is determined in response to the downlink BW.

9. The method of claim 8 wherein the IS threshold is determined in response to the downlink BW and an antenna configuration at a wireless communication network transmitter.

10. A User Equipment (UE) operative in a wireless communication network, the UE comprising:
    a receiver;
    a controller operative to control the receiver, and further operative to
        determine a cell transmission bandwidth (BW);
        set an Out of Synchronization (OoS) threshold based on the downlink BW;
        monitor at least one metric of downlink communication channel quality;
        compare the channel quality metric to the OoS threshold; and
        if the channel quality metric is below the OoS threshold, determine that the UE is out of synchronization with the network.

11. The method of claim 10 wherein the controller is operative to monitor at least one metric of downlink communication channel quality by averaging the value of the channel quality metric over a duration determined in response to the downlink BW.

12. The UE of claim 10 wherein the controller is further operative to determine an antenna configuration at a wireless communication network transmitter, and wherein setting an OoS threshold based on the downlink BW comprises setting an OoS threshold based on the downlink BW and the transmitter antenna configuration.

13. The UE of claim 10 wherein, after determining the UE is OoS, the controller is further operative to:
    monitor at least one metric of downlink communication channel quality; and
    if the channel quality metric exceeds an In Synchronization (IS) threshold, determine that the UE is in synchronization with the network.

14. The UE of claim 13 wherein the IS threshold is the same as the OoS threshold.

15. The UE of claim 13 wherein the IS threshold is different than the OoS threshold.

16. The UE of claim 15 wherein the controller determines the IS threshold in response to the downlink BW.

17. The UE of claim 16 wherein the controller determines the IS threshold in response to the downlink BW and an antenna configuration at a wireless communication network transmitter.

* * * * *